(12) United States Patent
Mihan et al.

(10) Patent No.: US 7,671,148 B2
(45) Date of Patent: Mar. 2, 2010

(54) CATALYST SYSTEM FOR OLEFIN POLYMERIZATION, ITS PRODUCTION AND USE

(75) Inventors: Shahram Mihan, Bad Soden (DE); Harald Schmitz, Weinheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 11/578,593

(22) PCT Filed: Apr. 21, 2005

(86) PCT No.: PCT/EP2005/004255

§ 371 (c)(1), (2), (4) Date: Oct. 16, 2006

(87) PCT Pub. No.: WO2005/103099

PCT Pub. Date: Nov. 3, 2005

(65) Prior Publication Data

US 2007/0207916 A1 Sep. 6, 2007

Related U.S. Application Data

(60) Provisional application No. 60/579,081, filed on Jun. 10, 2004.

(30) Foreign Application Priority Data

Apr. 26, 2004 (DE) .................. 10 2004 020 525

(51) Int. Cl.
- C08F 4/646 (2006.01)
- C08F 4/6592 (2006.01)
- C08F 4/70 (2006.01)
- B01J 31/12 (2006.01)
- B01J 31/22 (2006.01)

(52) U.S. Cl. ............... 526/116; 526/113; 526/115; 526/129; 526/160; 526/161; 526/165; 526/943; 502/113; 502/120; 502/152; 502/167

(58) Field of Classification Search .......... 526/113, 526/115, 116, 165, 129, 160, 161, 943; 502/113, 502/120, 152, 167

See application file for complete search history.

(56) References Cited

U.S. PATENT DOCUMENTS

| | | |
|---|---|---|
| 3,242,150 A | 3/1966 | Scoggin |
| 3,248,179 A | 4/1966 | Norwood |
| 5,527,752 A | 6/1996 | Reichle et al. |
| 5,763,547 A * | 6/1998 | Kolthammer et al. ........ 526/129 |
| 6,291,611 B1 * | 9/2001 | Kallio et al. .................. 526/129 |
| 6,465,386 B1 * | 10/2002 | Maddox et al. .............. 502/155 |
| 6,784,261 B1 | 8/2004 | Schopf et al. |
| 7,045,644 B2 | 5/2006 | Schopf et al. |
| 7,053,160 B1 | 5/2006 | Bingel et al. |

| | | |
|---|---|---|
| 2002/0058584 A1 | 5/2002 | Bennett et al. |

FOREIGN PATENT DOCUMENTS

| | | |
|---|---|---|
| CN | 1498904 | 5/2004 |
| WO | 95/12622 | 5/1995 |
| WO | 97/04015 | 2/1997 |
| WO | 98/27124 | 6/1998 |
| WO | 99/46302 | 9/1999 |
| WO | 00/24787 | 5/2000 |
| WO | 00/31090 | 6/2000 |
| WO | 00/55216 | 9/2000 |
| WO | 01/09148 | 2/2001 |
| WO | 01/23443 | 4/2001 |
| WO | 02/046249 | 6/2002 |
| WO | 02/088200 | 11/2002 |
| WO | 03/040201 | 5/2003 |

OTHER PUBLICATIONS

B. Small et al., "Highly Active Iron and Cobalt Catalysts for the Polymerization of Ethylene," *J. Am. Chem. Soc.*, vol. 120(16), p. 4049-4050 (1998).

M. Enders et al.,. "8-Quinolylcyclopentadienyl, a Ligand with a Tailored Fit for Chelate Complexes," *Chem. Ber.*, vol. 129, p. 459-463 (1996).

G. Britovsek et al., "Novel olefin polymerization catalysts based on iron and cobalt," *Chem. Commun.*, p. 849-850 (1998).

H. Wiesenfeldt et al., "*ansa*-Metallocene derivatives XVII. Racemic and *meso* diastereomers of group IV metallocene derivatives with symmetrically substituted, dimethylsilanediyl-bridged ligand frameworks. Crystal structure of R,S-Me$_2$Si(3-t-Bu-5-MeC$_5$H$_2$)$_2$ ZrCl$_2$," *Journal of Organometallic Chemistry*, vol. 369, p. 359-370 (1989).

P. Jutzi et al., "Cyclopentadienyl compounds with nitrogen donors in the side-chain," *Journal of Organometallic Chemistry* 500, p. 175-185 (1995).

J. Michl et al., (editor), *Chemical Reviews*, vol. 100(4-6), p. 1167-2476 (2000).

L. Fieser & M. Fieser; "Heterocyclen;" *Lehrbuch der Organischen Chemie*, p. 921-941(1957) Verlag Chemie.

Y. Chen et al., "Halogen-Substituted 2,6-Bis(imino)pyridyl Iron and Cobalt Complexes: Highly Active Catalysts for Polymerization and Oligomerization of Ethylene," *Organometallics*, vol. 22(21), p. 4312-4321 (2003) XP001189819.

(Continued)

*Primary Examiner*—Caixia Lu
(74) *Attorney, Agent, or Firm*—Jarrod N. Raphael; Jonathan L. Schuchardt

(57) ABSTRACT

Process for producing a catalyst system, which comprises the following steps: A) provision of a mixture of at least two different organic transition metal compounds, at least one hydrolyzed organoaluminum compound and a solvent and impregnation of a dry porous support component with the mixture from step A), with the total volume of the mixture being from 0.6 to 1.5 times the total pore volume of the support component, and also catalyst systems obtainable in this way and their use for olefin polymerization.

7 Claims, No Drawings

OTHER PUBLICATIONS

K. Musikabhumma et al., "Synthesis of Branched Polyethylenes by the Tandem Catalysis of Silica-Supported Linked Cyclopentadienyl-Amido Titanium Catalysts and a Homogeneous Dibromo Nickel Catalyst Having a Pyridylimine Ligand," *Journal of Polymer Science, Part A: Polymer Chemistry*; vol. 41(4), p. 528-544 (2003) XP008050767.

Y. Chen et al., "Fluoro-Substituted 2,6-Bis(imino)pyridyl Iron and Cobalt Complexes: High-Activity Ethylene Oligomerization Catalysts," *Organometallics*, vol. 22(6), p. 1231-1236 (2003) XP001144367.

Y. Hu et al., "Preparation of supported iron-based catalysts for olefin polymerization," Faming Zhuanli Shenquing Gongkai Shuomingshu (2004) (Abstract) XP002339505.

\* cited by examiner

CATALYST SYSTEM FOR OLEFIN POLYMERIZATION, ITS PRODUCTION AND USE

The present invention relates to a process for producing a catalyst system, which comprises the following steps:
A) provision of a mixture of at least two different organic transition metal compounds, at least one hydrolyzed organoaluminum compound and a solvent and
B) impregnation of a dry porous support component with the mixture from step A), with the total volume of the mixture being from 0.6 to 1.5 times the total pore volume of the support component.

In addition, the invention relates to the catalyst systems obtained in this way, the use of the catalyst systems for the polymerization or copolymerization of olefins and a process for preparing polyolefins by polymerization or copolymerization of olefins in the presence of the catalyst systems.

Organic transition metal compounds such as metallocene complexes are of great interest as catalysts for olefin polymerization because they make it possible to synthesize polyolefins which cannot be obtained using conventional Ziegler-Natta catalysts. For example, such single-site catalysts lead to polymers having a narrow molar mass distribution and uniform incorporation of comonomers. For these to be able to be used successfully in polymerization processes in the gas phase or in suspension, it is often advantageous for the metallocenes to be used in the form of a solid, i.e. for them to be applied to a solid support. Furthermore, the supported catalysts have a high productivity.

There are many ways in which application to a support can be carried out, i.e. the order in which the metallocenes and the cocatalysts are applied to the support and the conditions under which this is carried out can be varied widely. Thus, the patent application WO 95/12622 describes a heterogeneous polymerization catalyst composition produced by bringing a mixture of a metallocene and an aluminoxane in a solvent volume which does not exceed the total pore volume of the porous catalyst into contact with an inorganic oxide. The catalyst obtained in this way is said to give an improved morphology of the polymer.

However, the narrow molar mass distribution in the polymerization using metallocenes can produce problems in processing. To avoid this, catalyst systems having two active catalyst components have been developed. A broadening of the molecular weight up to bimodal products can be achieved in this way. The catalyst systems are, for example, combinations of two metallocenes, a metallocene and a Ziegler catalyst or a metallocene and a chromium catalyst. These two catalyst components are usually applied sequentially to the support material. This process is very time-consuming and costly since it comprises at least two separate impregnation steps. In addition, the catalyst systems obtained often have a low activity or cannot easily be metered into the polymerization reactor since the catalyst sticks to the walls of the metering apparatus and does not flow down readily.

It is therefore an object of the invention to provide a catalyst system which displays a high catalyst activity when used in polymerization processes and can readily be metered into the polymerization reactor. In addition, the catalyst system should be able to be produced simply and inexpensively.

We have accordingly found a process for producing a catalyst system, which comprises the following steps:
A) provision of a mixture of at least two different organic transition metal compounds, at least one hydrolyzed organoaluminum compound and a solvent and
B) impregnation of a dry porous support component with the mixture from step A), with the total volume of the mixture being from 0.6 to 1.5 times the total pore volume of the support component.

Furthermore, we have found a catalyst system for the polymerization of olefins which has an angle of repose determined in accordance with ISO 4324 is not more than 48° and comprises at least two different organic transition metal compounds and at least one hydrolyzed organoaluminum compound.

In addition, we have found the use of the catalyst system for the polymerization or copolymerization of olefins and a process for preparing polyolefins by polymerization or copolymerization of olefins in the presence of the catalyst system.

Possible organic transition metal compounds are in principle all compounds of the transition metals of groups 3 to 12 of the Periodic Table or the lanthamides which contain organic groups and preferably form catalysts which are active in olefin polymerization after reaction with the hydrolyzed organoaluminum compound. These are usually compounds in which at least one monodentate or polydentate ligand is bound via a sigma or pi bond to the central atom. Possible ligands include both ligands containing cyclopentadienyl radicals and ligands which are free of cyclopentadienyl radicals. A large number of such compounds which are suitable for olefin polymerization are described in Chem. Rev. 2000, Vol. 100, No. 4. Multinuclear cyclopentadienyl complexes are also suitable for olefin polymerization. Organic transition metal compounds containing only halogens and/or alkoxides are less well suited.

The process is particularly well-suited to organic transition metal compounds having at least one cyclopentadienyl ligand. Particularly useful complexes of this type are those of the formula (I)

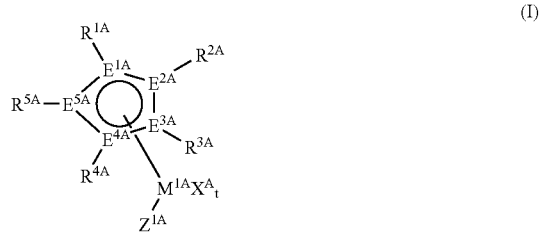

where the substituents and indices have the following meanings:
$M^{1A}$ is titanium, zirconium, hafnium, vanadium, niobium, tantalum, chromium, molybdenum or tungsten or an element of group 3 of the Periodic Table and of the lanthanides,
$X^A$ is fluorine, chlorine, bromine, iodine, hydrogen, $C_1$-$C_{10}$-alkyl, 5- to 7-membered cycloalkyl or cycloalkenyl, $C_2$-$C_{10}$-alkenyl, $C_6$-$C_{22}$-aryl, alkylaryl having from 1 to 10 carbon atoms in the alkyl part and from 6 to 20 carbon atoms in the aryl part, —$OR^{6A}$ or —$NR^{6A}R^{7A}$, or two radicals $X^A$ form a substituted or unsubstituted diene ligand, in particular a 1,3-diene ligand, and the radicals $X^A$ are identical or different and may be joined to one another, or $X^A$ is a ligand of the following formula:

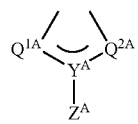

where
$Q^{1A}$-$Q^{2A}$ are each O, $NR^{6A}$, $CR^{7A}R^{7A}$ or S, and $Q^{1A}$ and $Q^{2A}$ are bound to $M^{1A}$, $Y^A$ is C or S and $Z^A$ is $OR^{6A}$, $SR^{6A}$, $NR^{6A}R^{7A}$, $PR^{6A}R^{7A}$, hydrogen, $C_1$-$C_{10}$-alkyl, 5- to 7-membered cycloalkyl or cycloalkenyl, $C_2$-$C_{10}$-alkenyl, $C_6$-$C_{22}$-aryl, alkylaryl having from 1 to 10 carbon atoms in the alkyl part and from 6 to 20 carbon atoms in the aryl part or $SiR^{8A}_3$, $E^{1A}$-$E^{5A}$ are each carbon or not more than one $E^{1A}$ to $E^{5A}$ is phosphorus or nitrogen, preferably carbon, t is 1, 2 or 3 and, depending on the valence of $M^{1A}$, has the value at which the complex of the general formula (I) is uncharged, where $R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{8A}_2$, $N(SiR^{8A}_3)_2$, $OR^{8A}$, $OSiR^{8A}_3$, $SiR^{8A}_3$, where the organic radicals $R^{1A}$-$R^{5A}$ may also be substituted by halogens and/or two radicals $R^{1A}$-$R^{5A}$, in particular vicinal radicals, may also be joined to form a five-, six- or seven-membered ring, and/or two vicinal radicals $R^{1A}$-$R^{5A}$ may be joined to form a five-, six- or seven-membered heterocycle which contains at least one atom from the group consisting of N, P, O and S, $R^{6A}$ and $R^{7A}$ are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, where the organic radicals $R^{6A}$ and $R^{7A}$ may also be substituted by halogens and/or two radicals $R^{6A}$ and $R^{7A}$ may also be joined to form a five-, six- or seven-membered ring, or $SiR^{8A}$ and the radicals $R^{8A}$ can be identical or different and can each be $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{8A}$ may also be substituted by halogens and/or two radicals $R^{8A}$ may also be joined to form a five-, six- or seven-membered ring, and $Z^{1A}$ is $X^A$ or

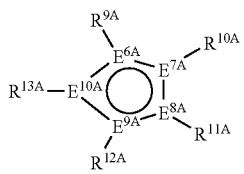

where the radicals $R^{9A}$ to $R^{13A}$ are each, independently of one another, hydrogen, $C_1$-$C_{22}$-alkyl, 5- to 7-membered cyclkoalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $R^{14A}$—C(O)O, $R^{14A}$—C(O)NR$^{14A}$, $NR^{14A}_2$, $N(SiR^{14A}_3)_2$, $OR^{14A}$, $OSiR^{14A}_3$, $SiR^{14A}_3$, where the organic radicals $R^{9A}$-$R^{13A}$ may also be substituted by halogens and/or two radicals $R^{9A}$-$R^{13A}$, in particular vicinal radicals, may also be joined to form a five-, six- or seven-membered ring, and/or two vicinal radicals $R^{9A}$-$R^{13A}$ may be joined to form a five-, six- or seven-membered heterocycle which contains at least one atom from the group consisting of N, P, O and S, where the radicals $R^{14A}$ are identical or different and are each $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{14A}$ may also be substituted by halogens and/or two radicals $R^{14A}$ may also be joined to form a five-, six- or seven-membered ring, and $E^{6A}$-$E^{10A}$ are each carbon or not more than one $E^{5A}$ to $E^{10A}$ is phosphorus or nitrogen, preferably carbon or the radicals $R^{4A}$ and $Z^{1A}$ together form an $-R^{15A}_v-A^{1A}-$ group, where $R^{15A}$ is

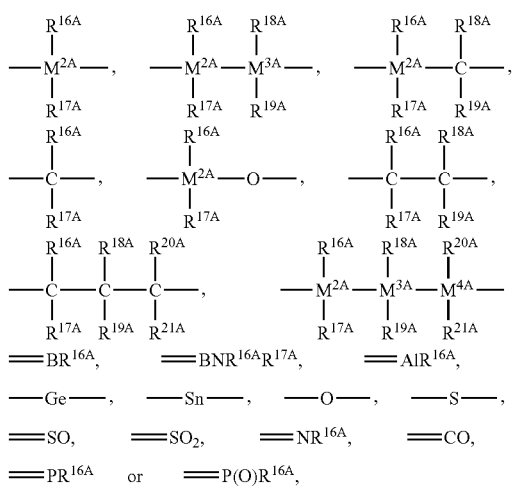

where $R^{16A}$-$R^{21A}$ are identical or different and are each a hydrogen atom, a halogen atom, a trimethylsilyl group, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{16A}$-$R^{21A}$ may also be substituted by halogens and/or two radicals $R^{16A}$-$R^{21A}$ may also be joined to form a five-, six- or seven-membered ring, and $M^{2A}$-$M^{4A}$ are each silicon, germanium or tin, preferably silicon, $A^{1A}$ is

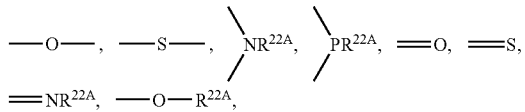

$-NR^{22A}_2$, $-PR^{22A}_2$ or an unsubstituted, substituted or fused, heterocyclic ring system, where the radicals $R^{22A}$ are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part or $Si(R^{23A})_3$, where the organic radicals $R^{22A}$ may also be substituted by halogens and/or two radicals $R^{22A}$ may also be joined to form a five-, six- or seven-membered ring, $R^{23A}$ is hydrogen, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, where the organic radicals $R^{23A}$ may also be substituted by halogens and/or two radicals $R^{23A}$ may also be joined to form a five-, six- or seven-membered ring, v is 1 or when $A^{1A}$ is an unsubstituted, substituted or fused, heterocyclic ring system may also be 0, or the radicals $R^{4A}$ and $R^{12A}$ together form an —$R^{15A}$— group.

Such complexes can be synthesized by methods known per se, with preference being given to reacting the appropriately substituted, cyclic hydrocarbon anions with halides of titanium, zirconium, hafnium or chromium.

For the purposes of the present invention, the term alkyl refers to a linear or branched alkyl such as methyl, ethyl, n-propyl, isopropyl, n-butyl, isobutyl, tert-butyl, n-pentyl, n-hexyl, n-heptyl, n-octyl, n-nonyl or n-decyl. The term alkenyl refers to a linear or branched alkenyl in which the double bond can be internal or terminal, e.g. vinyl, 1-allyl, 2-allyl, 3-allyl, 1-butenyl, 2-butenyl, 1-pentenyl or 1-hexenyl. The term $C_6$-$C_{22}$-aryl refers to an unsubstituted, substituted or fused aryl system which may be substituted by further alkyl groups, e.g. phenyl, naphthyl, biphenyl, anthranyl, o-, m-, p-methylphenyl, 2,3-, 2,4-, 2,5-, or 2,6-dimethylphenyl, 2,3, 4-, 2,3,5-, 2,3,6-, 2,4,5-, 2,4,6- or 3,4,5-trimethylphenyl. The term arylalkyl refers to an aryl-substituted alkyl which may be substituted by further alkyl groups, e.g. benzyl, o-, m-, p-methylbenzyl, 1- or 2-ethylphenyl.

$A^{1A}$ can, for example together with the bridge $R^{15A}$, form an amine, ether, thioether or phosphine. $A^{1A}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups, which can contain from 1 to 4 nitrogen atoms and/or a sulfur or oxygen atom as ring atoms in addition to carbon atoms, are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups, which can contain from one to four nitrogen atoms and/or a phosphorus atom, are 2-pyridinyl, 2-phosphabenzolyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957.

The radicals $X^A$ in the general formula (I) are preferably identical and are preferably fluorine, chlorine, bromine, $C_1$-$C_7$-alkyl or aralkyl, in particular chlorine, methyl or benzyl.

This type of complexes of the formula (I) also includes compounds having at least one ligand which is formed by a cyclopentadienyl or heterocyclopentadienyl and a fused-on heterocycle, with the heterocycles preferably being aromatic and preferably containing nitrogen and/or sulfur. Such compounds are described, for example, in WO 98/22486. These are, in particular, dimethylsilanediyl(2-methyl-4-phenylindenyl)(2,5-dimethyl-N-phenyl-4-azapentalene)zirconium dichloride, dimethylsilanediylbis(2-methyl-4-phenyl-4-hydroazulenyl)zirconium dichloride, dimethylsilanediylbis(2-ethyl-4-phenyl-4-hydroazulenyl)zirconium dichloride, bis(2,5-dimethyl-N-phenyl-4-azapentalene)zirconium dichloride or (indenyl)(2,5-dimethyl-N-phenyl-4-azapentalene)zirconium dichloride.

Among the complexes of the general formula (I), preference is given to

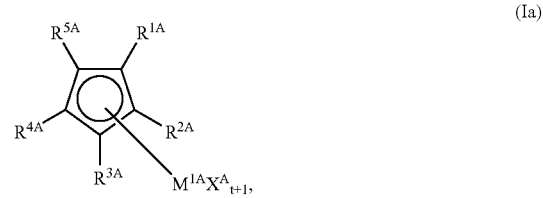

(Ia)

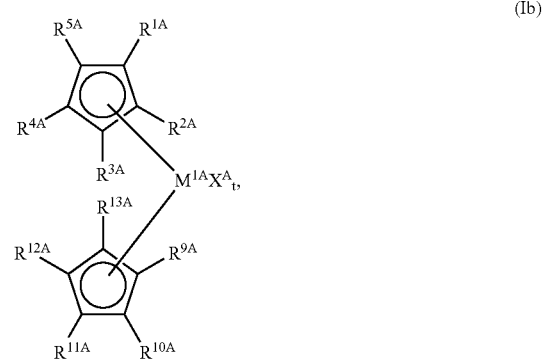

(Ib)

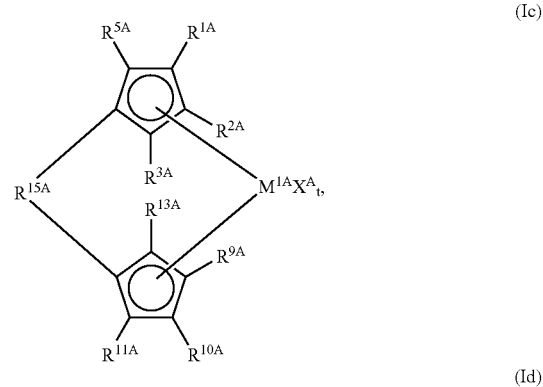

(Ic)

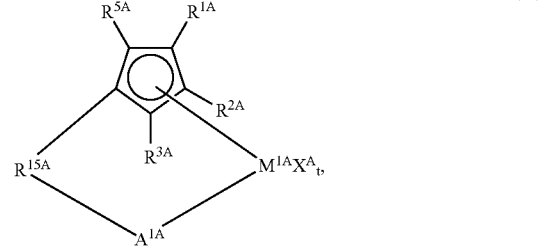

(Id)

where the substituents and indices have the following meanings:

$M^{1A}$ is titanium, zirconium, hafnium, vanadium, niobium, tantalum, chromium, molybdenum or tungsten or an element of group 3 of the Periodic Table and of the lanthanides, $X^A$ is fluorine, chlorine, bromine, iodine, hydrogen, $C_1$-$C_{10}$-alkyl, 5- to 7-membered cycloalkyl or cycloalkenyl, $C_2$-$C_{10}$-alkenyl, $C_6$-$C_{22}$-aryl, alkylaryl having from 1 to 10 carbon atoms in the alkyl part and from 6 to 20 carbon atoms in the aryl part, —$OR^{6A}$ or —$NR^{6A}R^{7A}$, or two radicals $X^A$ form a substituted or unsubstituted diene ligand, in particular a 1,3-diene ligand, and the radicals $X^A$ are identical or different and may be joined to one another, or $X^A$ is a ligand of the following formula:

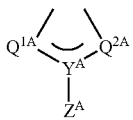

where $Q^{1A}$-$Q^{2A}$ are each O, $NR^{6A}$, $CR^{6A}R^{7A}$ or S, and $Q^{1A}$ and $Q^{2A}$ are bound to $M^{1A}$, $Y^A$ is C or S and $Z^A$ is $OR^{6A}$, $SR^{6A}$, $NR^6R^{7A}$, $PR^{6A}R^{7A}$, hydrogen, $C_1$-$C_{10}$-alkyl, 5- to 7-membered cycloalkyl or cycloalkenyl, $C_2$-$C_{10}$-alkenyl, $C_6$-$C_{22}$-aryl, alkylaryl having from 1 to 10 carbon atoms in the alkyl part and from 6 to 20 carbon atoms in the aryl part or $SiR^{8A}{}_3$, $E^{1A}$-$E^{5A}$ are each carbon or not more than one $E^{1A}$ to $E^{5A}$ is phosphorus or nitrogen, preferably carbon, t is 1, 2 or 3 and, depending on the valence of $M^{1A}$, has the value at which the complex of the general formula (IaΘd) is uncharged, where $R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{8A}{}_2$, $N(SiR^{8A}{}_3)_2$, $OR^{8A}$, $OSiR^{8A}{}_3$, $SiR^{8A}{}_3$, where the organic radicals $R^{1A}$-$R^{5A}$ may also be substituted by halogens and/or two radicals $R^{1A}$-$R^{5A}$, in particular vicinal radicals, may also be joined to form a five-, six- or seven-membered ring, and/or two vicinal radicals $R^{1A}$-$R^{5A}$ may be joined to form a five-, six- or seven-membered heterocycle which contains at least one atom from the group consisting of N, P, O and S, $R^{1A}$ and $R^{7A}$ are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, where the organic radicals $R^{6A}$ and $R^{7A}$ may also be substituted by halogens and/or two radicals $R^{6A}$ and $R^{7A}$ may also be joined to form a five-, six- or seven-membered ring, or $SiR^{8A}$ and the radicals $R^{8A}$ can be identical or different and can each be $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{8A}$ may also be substituted by halogens and/or two radicals $R^{8A}$ may also be joined to form a five-, six- or seven-membered ring, and $R^{9A}$ to $R^{13A}$ are each, independently of one another, hydrogen, $C_1$-$C_{22}$-alkyl, 5- to 7-membered cyclkoalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $R^{14A}$—C(O)O, $R^{14A}$—C(O)NR$^{14A}$, $NR^{14A}{}_2$, $N(SiR^{14A}{}_3)_2$, $OR^{14A}$, $OSiR^{14A}{}_3$, $SiR^{14A}{}_3$, where the organic radicals $R^{9A}$-$R^{13A}$ may also be substituted by halogens and/or two radicals $R^{9A}$-$R^{13A}$, in particular vicinal radicals, may also be joined to form a five-, six- or seven-membered ring, and/or two vicinal radicals $R^{9A}$-$R^{13A}$ may be joined to form a five-, six- or seven-membered heterocycle which contains at least one atom from the group consisting of N, P, O and S, where the radicals $R^{14A}$ are identical or different and are each $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{14A}$ may also be substituted by halogens and/or two radicals $R^{14A}$ may also be joined to form a five-, six- or seven-membered ring, and $E^{6A}$-$E^{10A}$ are each carbon or not more than one $E^{6A}$ to $E^{10A}$ is phosphorus or nitrogen, preferably carbon $R^{15A}$ is

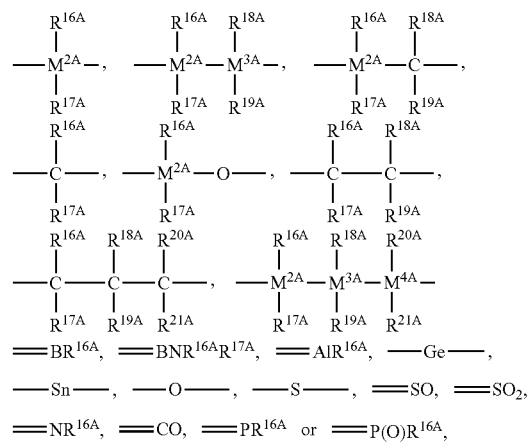

where $R^{16A}$-$R^{21A}$ are identical or different and are each a hydrogen atom, a halogen atom, a trimethylsilyl group, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_{10}$-alkoxy or $C_6$-$C_{10}$-aryloxy, where the organic radicals $R^{16A}$-$R^{21A}$ may also be substituted by halogens and/or two radicals $R^{6A}$-$R^{21A}$ may also be joined to form a five-, six- or seven-membered ring, and $M^{2A}$-$M^{4A}$ are each silicon, germanium or tin, preferably silicon, $A^{1A}$ is

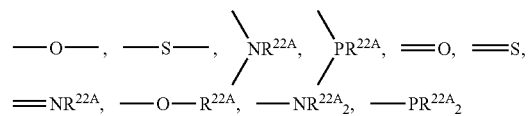

or an unsubstituted, substituted or fused, heterocyclic ring system, where the radicals $R^{22A}$ are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part or $Si(R^{23A})_3$, where the organic radicals $R^{22A}$ may also be substituted by halogens and/or two radicals $R^{22A}$ may also be joined to form a five-, six- or seven-membered ring, $R^{23A}$ is hydrogen, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, where the organic radicals $R^{23A}$ may also be substituted by halogens and/or two radicals $R^{23A}$ may also be joined to form a five-, six- or seven-membered ring, v is 1 or when $A^{1A}$ is an unsubstituted, substituted or fused, heterocyclic ring system may also be 0.

Among the complexes of the formula (Ia), particular preference is given to those in which $M^{1A}$ is titanium, zirconium or hafnium, $X^A$ is chlorine, $C_1$-$C_4$-alkyl, phenyl, alkoxy or aryloxy, a carboxylate of the formula $R^{6A}$—C(O)O— or carbamate of the formula $R^{6A}R^{7A}N$—C(O)O—, t is 1 or 2, preferably 2, $R^{1A}$ to $R^{5A}$ are each hydrogen, $C_1$-$C_6$-alkyl or two adjacent radicals $R^{1A}$ to $R^{5A}$ form a substituted or unsubstituted benzo group, where two radicals $R^{1A}$ to $R^{5A}$ may also be joined to form a five-, six- or seven-membered ring, and $R^{6A}$ and $R^{7A}$ are each $C_1$-$C_{10}$-alkyl, $C_6$-$C_{22}$-aryl, alkylaryl, arylalkyl each having from 1 to 10 carbon atoms in the alkyl part and from 6 to 20 carbon atoms in the aryl part.

Preferred complexes of the formula (Ia) are indenylzirconium tris(diethylcarbamate), indenylzirconium tris(trimethylacetate), indenylzirconium tris(p-toluate), indenylzirconium tris(benzoate), indenylzirconium tris(pivalate), 2-methylindenylzirconium tris(diethylcarbamate), methylcyclopentadienylzirconium tris(trimethylacetate). The preparation of such compounds (Ia) and particularly preferred embodiments of (Ia) are described, for example, in U.S. Pat. No. 5,527,752.

Among the complexes of the formula (Ib), preference is given to those in which $M^{1A}$ is zirconium, hafnium or chormium, $X^A$ is fluorine, chlorine, $C_1$-$C_4$-alkyl or benzyl, or two radicals $X^A$ form a substituted or unsubstituted butadiene ligand, t is 0 in the case of chromium and otherwise 1 or 2, preferably 2, $R^{1A}$ to $R^{5A}$ are each hydrogen, $C_1$-$C_8$-alkyl, $C_6$-$C_{10}$-aryl, $NR^{8A}_2$, $OSiR^{8A}_3$ or $Si(R^{8A})_3$ and $R^{9A}$ to $R^{13A}$ are each hydrogen, $C_1$-$C_8$-alkyl or $C_6$-$C_{10}$-aryl, $NR^{14A}_2$, $OSiR^{14A}_3$ or $Si(R^{14A})_3$ and $R^{8A}$ and $R^{14A}$ can be identical or different and can each be $C_1$-$C_{10}$-alkyl, 5- to 7-membered cycloalkyl or cycloalkenyl, $C_6$-$C_{22}$-aryl, $C_1$-$C_{10}$-alkoxy or $C_6$-$C_{10}$-aryloxy, where the organic radicals $R^{8A}$ and $R^{14A}$ may also be substituted by halogens and/or two radicals $R^{8A}$ or $R^{14A}$ may also be joined to form a five-, six- or seven-membered ring, or two radicals $R^{1A}$ to $R^{5A}$ and/or $R^{9A}$ to $R^{13A}$ together with the $C_5$ ring form an indenyl, fluorenyl or substituted indenyl or fluorenyl system.

Particularly useful complexes of the formula (Ib) are ones in which the cyclopentadienyl radicals are identical.

Examples of particularly useful complexes are bis(cyclopentadienyl)chromium and bis(indenyl)chromium.

Further examples of particularly useful complexes of the formula (Ib) are those in which $M^{1A}$ is hafnium and $X^A$ is fluorine, chlorine, $C_1$-$C_4$-alkyl or benzyl, or two radicals $X^A$ form a substituted or unsubstituted butadiene ligand, t is 2, $R^{1A}$ to $R^{5A}$ are each hydrogen, $C_1$-$C_8$-alkyl, $C_6$-$C_{10}$-aryl, and $R^{9A}$ to $R^{13A}$ are each hydrogen, $C_1$-$C_8$-alkyl or $C_6$-$C_{10}$-aryl, $R^{8A}$ and $R^{14A}$ can be identical or different and can each be $C_1$-$C_{10}$-alkyl, 5- to 7-membered cycloalkyl or cycloalkenyl, $C_6$-$C_{22}$-aryl, $C_1$-$C_{10}$-alkoxy or $C_6$-$C_{10}$-aryloxy, where the organic radicals $R^{8A}$ and $R^{14A}$ may also be substituted by halogens and/or two radicals $R^{8A}$ or $R^{14A}$ may also be joined to form a five-, six- or seven-membered ring, or two radicals $R^{1A}$ to $R^{5A}$ and/or $R^{9A}$ to $R^{13A}$ together with the $C_5$ ring form an indenyl, fluorenyl or substituted indenyl or fluorenyl system, for example:

bis(cyclopentadienyl)hafnium dichloride, bis(indenyl)hafnium dichloride, bis(fluorenyl)hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethylcyclopentadienyl)hafnium dichloride, bis(1-n-butyl-3-methylcyclopentadienyl)hafnium dichloride, (cyclopentadienyl)(methylcyclopentadienyl)hafnium dichloride, (cyclopentadienyl)(n-butylcyclopentadienyl)hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis(tetramethylcyclopentadienyl)hafnium dichloride, and also the corresponding dimethylhafnium compounds.

A further preferred group of complexes (Ib) are those in which:

$M^{1A}$ is zirconium, $X^A$ is fluorine, chlorine, $C_1$-$C_4$-alkyl or benzyl, or two radicals $X^A$ form a substituted or unsubstituted butadiene ligand, t is 1 or 2, preferably 2, $R^{1A}$ to $R^{5A}$ are each hydrogen, $C_1$-$C_8$-alkyl, $C_6$-$C_{10}$-aryl, $OSiR^{8A}_3$ and $R^{9A}$ to $R^{13A}$ are each hydrogen, $C_1$-$C_8$-alkyl or $C_6$-$C_{10}$-aryl, $OSiR^{14A}_3$ and $R^{8A}$ and $R^{14A}$ can be identical or different and can each be $C_1$-$C_{10}$-alkyl, 5- to 7-membered cycloalkyl or cycloalkenyl, $C_6$-$C_{15}$-aryl, $C_1$-$C_{10}$-alkoxy or $C_6$-$C_{10}$-aryloxy, where the organic radicals $R^{3A}$ and $R^{14A}$ may also be substituted by halogens and/or two radicals $R^{8A}$ or $R^{14A}$ may also be joined to form a five-, six- or seven-membered ring, or two radicals $R^{1A}$ to $R^{5A}$ and/or $R^{9A}$ to $R^{13A}$ together with the $C_5$ ring form an indenyl, fluorenyl or substituted indenyl or fluorenyl system.

The preparation of such systems and preferred embodiments are disclosed, for example, in FI-A-960437.

Particularly useful complexes of the formula (Ic) are those in which
$R^{15A}$ is

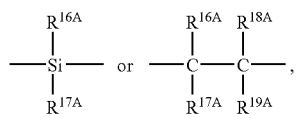

$M^{1A}$ is titanium, zirconium or hafnium, in particular zirconium or hafnium, the radicals $X^A$ are identical or different and are each chlorine, $C_1$-$C_4$-alkyl, benzyl, phenyl or $C_7$-$C_{15}$-alkylaryloxy.

Further preferred complexes of the formula (Ic) are bridged bisindenyl complexes in the rac or pseudorac form, where the term pseudorac refers to complexes in which the two indenyl ligands are in the rac arrangement relative to one another when all other substituents of the complex are disregarded.

Further examples of particularly useful complexes (Ic) are methylenebis(cyclopentadienyl)zirconium dichloride, methylenebis(3-methylcyclopentadienyl)zirconium dichloride, methylenebis(3-n-butylcyclopentadienyl)zirconium dichloride, methylenebis(indenyl)zirconium dichloride, methylenebis(tetrahydroindenyl)zirconium dichloride, isopropylidenebis(cyclopentadienyl)zirconium dichloride, isopropylidenebis(3-trimethylsilylcyclopentadienyl)zirconium dichloride, isopropylidenebis(3-methylcyclopentadienyl)zirconium dichloride, isopropylidenebis(3-n-butylcyclopentadienyl)zirconium dichloride, isopropylidenebis(3-phenylcyclopentadienyl)zirconium dichloride, isopropylidenebis(indenyl)zirconium dichloride, isopropylidenebis(tetrahydroindenyl)zirconium dichloride, dimethylsilanediylbis(cyclopentadienyl)zirconium dichloride, dimethylsilanediylbis(indenyl)zirconium dichloride, dimethylsilanediylbis(tetrahydroindenyl)zirconium dichloride, ethylenebis(cyclopentadienyl)zirconium dichloride, ethylenebis(indenyl)zirconium dichloride, ethylenebis(tetrahydroindenyl)zirconium dichloride, tetramethylethylene-9-fluorenylcyclopentadienylzirconium dichloride, dimethylsilanediylbis(tetramethylcyclopentadienyl)zirconium dichloride, dimethylsilanediylbis(3-trimethylsilylcyclopentadienyl)zirconium dichloride, dimethylsilanediylbis(3-methylcyclopentadienyl)zirconium dichloride, dimethylsilanediylbis(3-n-butylcyclopentadienyl)zirconium dichloride, dimethylsilanediylbis(3-tert-butyl-5-methylcyclopentadienyl)zirconium dichloride, dimethylsilanediylbis(3-tert-butyl-5-ethylcyclopentadienyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(3-methyl-5-methylcyclopentadienyl)zirconium dichloride, dimethylsilanediylbis(3-ethyl-5-isopropylcyclopentadienyl)zirconium dichloride, dimethylsilanediylbis(2-ethylindenyl)zirconium dichloride, dimethylsilanediylbis(2-methyl-4,5-benzindenyl)zirconium dichloride, dimethylsilanediylbis(2-ethyl-4,5-benzindenyl)zirconium dichloride, methylphenylsilanediylbis(2-methyl-4,5-benzindenyl)zirconium dichloride, methylphenylsilanediylbis(2-ethyl-4,5-benzindenyl)zirconium dichloride, diphenylsilanediylbis(2-methyl-4,5-benzindenyl)zirconium dichloride, diphenylsilanediylbis(2-ethyl-4,5-benzindenyl)zirconium dichloride, diphenylsilanediylbis(2-methylindenyl)hafnium dichloride, dimethylsilanediylbis(2-methyl-4-phenylindenyl)zirconium dichloride, dimethylsilanediylbis(2-ethyl-4-phenylindenyl)zirconium dichloride, dimethylsilanediylbis(2-methyl-4-(1-naphthyl)indenyl)zirconium dichloride, dimethylsilanediylbis(2-ethyl-4-(1-naphthyl)indenyl)zirconium dichloride, dimethylsilanediylbis(2-propyl-4-(1-naphthyl)indenyl)zirconium dichloride, dimethylsilanediylbis(2-i-butyl-4-(1-naphthyl)-indenyl)zirconium dichloride, dimethylsilanediylbis(2-propyl-4-(9-phenanthryl)indenyl)zirconium dichloride, dimethylsilanediylbis(2-methyl-4-isopropylindenyl)zirconium dichloride, dimethylsilanediylbis(2,7-dimethyl-4-isopropylindenyl)zirconium dichloride, dimethylsilanediylbis(2-methyl-4,6-diisopropylindenyl)zirconium dichloride, dimethylsilanediylbis(2-methyl-4-[p-trifluoromethylphenyl]indenyl)zirconium dichloride, dimethylsilanediylbis(2-methyl-4-[3',5'-dimethylphenyl]indenyl)zirconium dichloride, dimethylsilanediylbis(2-methyl-4-[4'-tert-butylphenyl]indenyl)zirconium dichloride, diethylsilanediylbis(2-methyl-4-[4'-tert-butylphenyl]indenyl)-zirconium dichloride, dimethylsilanediylbis(2-ethyl-4-[4'-tert-butylphenyl]indenyl)zirconium dichloride, dimethylsilanediylbis(2-propyl-4-[4'-tert-butylphenyl]indenyl)zirconium dichloride, dimethylsilanediylbis(2-isopropyl-4-[4'-tert-butylphenyl]indenyl)zirconium dichloride, dimethylsilanediylbis(2-n-butyl-4-[4'-tert-butylphenyl]indenyl)zirconium dichloride, dimethylsilanediylbis(2-hexyl-4-[4'-tert-butylphenyl]indenyl)zirconium dichloride, dimethylsilanediyl(2-isopropyl-4-phenylindenyl)(2-methyl-4-phenylindenyl)zirconium dichloride, dimethylsilanediyl(2-isopropyl-4-(1-naphthyl)indenyl)(2-methyl-4-(1-naphthyl)indenyl)zirconium dichloride, dimethylsilanediyl(2-isopropyl-4-[4'-tert-butylphenyl]indenyl)(2-methyl-4-[4'-tert-butylphenyl] indenyl)zirconium dichloride, dimethylsilanediyl(2-isopropyl-4-[4'-tert-butylphenyl]indenyl)(2-ethyl-4-[4'-tert-butylphenyl]indenyl)zirconium dichloride, dimethylsilanediyl(2-isopropyl-4-[4'-tert-butylphenyl]indenyl)(2-methyl-4-[3',5'-bis-tert-butylphenyl]indenyl)zirconium dichloride, dimethylsilanediyl(2-isopropyl-4-[4'-tert-butylphenyl]indenyl)(2-methyl-4-[1'-naphthyl]indenyl)-zirconium dichloride and ethylene(2-isopropyl-4-[4'-tert-butylphenyl]indenyl)(2-methyl-4-[4'-tert-butylphenyl]indenyl)zirconium dichloride, and also the corresponding dimethylzirconium, monochloromono(alkylaryloxy)zirconium and di(alkylaryloxy)zirconium compounds. The complexes are preferably used in the rac form.

Such complexes can be synthesized by methods known per se, with preference being given to reacting the appropriately substituted, cyclic hydrocarbon anions with halides of titanium, zirconium, hafnium, vanadium, niobium, tantalum or chromium. Examples of appropriate preparative methods are described, inter alia, in the Journal of Organometallic Chemistry, 369 (1989), 359-370.

Particularly useful complexes of the general formula (Id) are those in which $M^{1A}$ is titanium or zirconium, in particular titanium, and $X^A$ is chlorine, $C_1$-$C_4$-alkyl or phenyl or two radicals $X^A$ form a substituted or unsubstituted butadiene ligand, $R^{15A}$ is

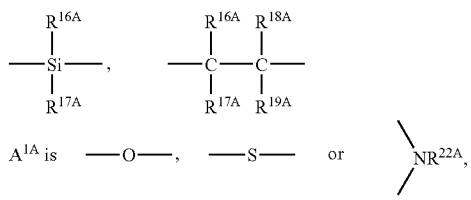

t is 1 or 2, preferably 2, $R^{1A}$ to $R^{3A}$ and $R^{5A}$ are each hydrogen, $C_1$-$C_{10}$-alkyl, 5- to 7-membered cycloalkyl or cycloalkenyl, $C_6$-$C_{22}$-aryl, $NR^{8A}{}_2$ or $Si(R^{8A})_3$, where two radicals $R^{1A}$ to $R^{3A}$ and $R^{5A}$ may also be joined to form a five-, six- or seven-membered ring, with particular preference being given to all $R^{1A}$ to $R^{3A}$ and $R^{5A}$ being methyl.

Particularly suitable complexes of the formula (Id) are dimethylsilanediyl(tetramethylcyclopentadienyl)(phenylamino)titanium dichloride, dimethylsilanediyl(tetramethylcyclopentadienyl)(benzylamino)titanium dichloride, dimethylsilanediyl(tetramethylcyclopentadienyl)(tert-butylamino)titanium dichloride, dimethylsilanediyl(tetramethylcyclopentadienyl)(adamantyl)titanium dichloride or dimethylsilanediyl(indenyl)(tert-butylamino) titanium dichloride.

A further group of particularly useful complexes of the formula (Id) is made up of complexes in which $M^{1A}$ is titanium, vanadium or chromium, preferably in the oxidation state III and $X^A$ is chlorine, $C_1$-$C_4$-alkyl or phenyl or two radicals $X^A$ form a substituted or unsubstituted butadiene ligand, $R^{15A}$ is

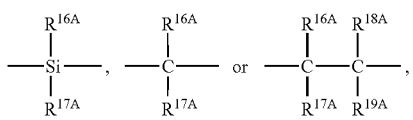

$A^{1A}$ is —O—$R^{22A}$, —$NR^{22A}{}_2$, —$PR^{22A}{}_2$ or an unsubstituted, substituted or fused, heterocyclic, in particular heteroaromatic, ring system, v is 1 or when $A^{1A}$ is an unsubstituted, substituted or fused, heterocyclic ring system may be 0 or 1 and $R^{1A}$ to $R^{3A}$ and $R^{5A}$ are each hydrogen, $C_1$-$C_{10}$-alkyl, 5- to 7-membered cycloalkyl or cycloalkenyl, $C_6$-$C_{22}$-aryl or $Si(R^{8A})_3$, where two radicals $R^{1A}$ to $R^{3A}$ and $R^{5A}$ may also be joined to form a five-, six- or seven-membered ring.

In a preferred embodiment of (Id), $A^{1A}$ is an unsubstituted, substituted or fused, heteroaromatic ring system and $M^{1A}$ is chromium. $A^{1A}$ is very particularly preferably an unsubstituted or substituted, e.g. alkyl-substituted, quinolyl, in particular substituted or unsubstituted quinolyl linked in position 8 or 2, and v is 0 or $A^{1A}$ is a substituted or unsubstituted pyridyl linked in position 2 and v is 1. Preferred organic transition metal compounds of this type are 1-(8-quinolyl)-2,4-dimethylcyclopentadienylchromium(III) dichloride, 1-(8-quinolyl)-3-isopropyl-5-methylcyclopentadienylchromium(III) dichloride, 1-(8-quinolyl)-3-tert-butyl-5-methylcyclopentadienylchromium(III) dichloride, 1-(8-quinolyl)-2,3,4,5-tetramethylcyclopentadienylchromium(III) dichloride, 1-(8-quinolyl)tetrahydroindenylchromium(III) dichloride, 1-(8-quinolyl)indenylchromium(III) dichloride, 1-(8-quinolyl)-2-methylindenylchromium(III) dichloride, 1-(8-quinolyl)-2-isopropylindenylchromium(III) dichloride, 1-(8-quinolyl)-2-ethylindenylchromium(III) dichloride, 1-(8-quinolyl)-2-tert-butylindenylchromium(III) dichloride, 1-(8-quinolyl)benzindenylchromium(III) dichloride, 1-(8-quinolyl)-2-methylbenzindenylchromium(III) dichloride, 1-(8-(2-methylquinolyl))-2,4-dimethylcyclopentadienylchromium(III) dichloride, 1-(8-(2-methylquinolyl))-2,3,4,5-tetramethylcyclopentadienylchromium(III) dichloride, 1-(8-(2-methylquinolyl))tetrahydroindenylchromium (III) dichloride, 1-(8-(2-methylquinolyl))indenylchromium (III) dichloride, 1-(8-(2-methylquinolyl))-2-methylindenylchromium(III) dichloride, 1-(8-(2-methylquinolyl))-2-isopropylindenylchromium(III) dichloride, 1-(8-(2-methylquinolyl))-2-ethylindenylchromium(III) dichloride, 1-(8-(2-methylquinolyl))-2-tert-butylindenylchromium(III) dichloride, 1-(8-(2-methylquinolyl))benzindenylchromium (III) dichloride, 1-(2-pyridylmethyl)tetramethylcyclopentadienylchromium(III) dichloride, 1-(2-pyridylmethyl)indenylchromium(III) dichloride and 1-(8-(2-methylquinolyl))-2-methylbenzindenylchromium(III) dichloride.

In a particularly preferred embodiment of (Id), at least one of the substituents $R^{1A}$ to $R^{3A}$ and $R^{5A}$ is a $C_6$-$C_{22}$-aryl, $A^{1A}$ is a substituted or unsubstituted quinolyl linked in position 8 or 2 and v is 0 or $A^{1A}$ is a substituted or unsubstituted pyridyl linked in position 2 and v is 1 and MIA is chromium, for example 1-(8-quinolyl)-3-phenylcyclopentadienylchromium (III) dichloride, 1-(8-quinolyl)-3-(1-naphthyl)cyclopentadienylchromium(III) dichloride, 1-(8-quinolyl)-3-(4-trifluoromethylphenylcyclopentadienylchromium(III) dichloride, 1-(8-quinolyl)-3-(4-chlorophenyl)cyclopentadienylchromium(III) dichloride, 1-(8-quinolyl)-2-methyl-3-phenylcyclopentadienylchromium(III) dichloride, 1-(8-quinolyl)-2-methyl-3-(1-naphthyl)cyclopentadienylchromium(III) dichloride, 1-(8-quinolyl)-2-methyl-3-(4-trifluoromethylphenylcyclopentadienylchromium(III) dichloride, 1-(8-quinolyl)-2-methyl-3-(4-chlorophenyl)cyclopentadienylchromium(III) dichloride, 1-(8-quinolyl)-2-phenylindenylchromium(III) dichloride, 1-(8-quinolyl)-2-phenylbenzindenylchromium(III) dichloride, 1-(8-(2-methylquinolyl))-2-methyl-3-phenylcyclopentadienylchromium(III) dichloride, 1-(8-(2-methylquinolyl))-2-phenylindenylchromium(III) dichloride, 1-(2-pyridylmethyl)-3-phenylcyclopentadienylchromium (III) dichloride, 1-(2-pyridylmethyl)-2-methyl-3-phenylcyclopentadienylchromium(III) dichloride, 1-(2-quinolylmethyl)-3-phenylcyclopentadienylchromium dichloride, 1-(2-pyridylethyl))-3-phenyl-cyclopentadienylchromium dichloride, 1-(2-pyridyl-1-methylethyl)-3-phenylcyclopentadienylchromium dichloride, 1-(2-pyridyl-1-phenylmethyl)-3-phenyl-cyclopentadienylchromium dichloride, 1-(2-pyridylmethyl)indenylchromium(III) dichloride, 1-(2-quinolylmethyl)indenylchromium dichloride, 1-(2-pyridyl-ethyl)indenylchromium dichloride, 1-(2-pyridyl-1-methylethyl)indenylchromium dichloride, 1-(2-pyridyl-1-phenylmethyl)indenylchromium dichloride, 5-[(2-pyridyl)methyl]-1,2,3,4-tetramethylcyclopentadienylchromium dichloride and 1-(8-(2-methylquinolyl))-2-methylbenzindenylchromium(III) dichloride.

The preparation of such functional cyclopentadienyl ligands has been known for a long time. Various synthetic routes to these complexing ligands are described, for example, by M. Enders et. al. in Chem. Ber. (1996), 129, 459-463, or P. Jutzi and U. Siemeling in J. Orgmet. Chem. (1995), 500, 175-185.

The metal complexes, in particular the chromium complexes, can be obtained in a simple way by reacting the appropriate metal salts, e.g. metal chlorides, with the ligand anion (e.g. in a manner analogous to the examples in DE-A-19710615).

Further suitable compounds are organic transition metal compounds containing no cyclopentadienyl radical, hereinafter referred to as Cp-free complexes. Suitable Cp-free complexes include complexes of the general formula (II)

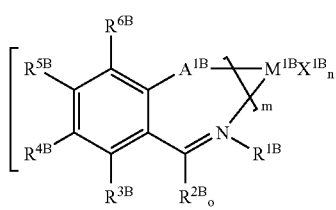

where
$M^{1B}$ is titanium, zirconium or hafnium,
$R^{1B}$ to $R^{6B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part or $SiR^{9B}_3$, where the organic radicals $R^{1B}$-$R^{6B}$ may also be substituted by halogens and/or two radicals $R^{1B}$-$R^{6B}$ in particular vicinal radicals, may also be joined to form a five-, six- or seven-membered ring, and/or two vicinal radicals $R^{1B}$-$R^{6B}$ may be joined to form a five-, six- or seven-membered heterocycle containing at least one atom from the group consisting of N, P, O and S,
the radicals $X^{1B}$ are each, independently of one another, fluorine, chlorine, bromine, iodine, hydrogen, $C_1$-$C_{10}$-alkyl, $C_2$-$C_{10}$-alkenyl, $C_6$-$C_{15}$-aryl, alkylaryl having from 1 to 10 carbon atoms in the alkyl part and from 6 to 20 carbon atoms in the aryl part, $-OR^{7B}$, $-NR^{7B}R^{8B}$, $R^{7B}COO-$ or $R^{7B}R^{8B}N-COO-$, and the radicals $X^{1B}$ may be joined to one another,
$A^{1B}$ is $-O-$, $-OR^{7B}$, or $-NR^{7B}R^{8B}-$,
m is 1 or 2,
n is 1, 2 or 3 and, depending on the valence of MIA, has the value at which the metallocene complex of the general formula (II) is uncharged,
o is 1 when $NR^{1B}$ together with the adjacent carbon forms an imine, or is 2 when $NR^{1B}$ carries a negative charge, where
$R^{7B}$ and $R^{8B}$ are each $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part or $SiR^{9B}_3$, where the organic radicals $R^{7B}$ and $R^{8B}$ may also be substituted by halogens and/or two radicals $R^{7B}$ and $R^{8B}$ may also be joined to form a five-, six- or seven-membered ring and
the radicals $R^{9B}$ can be identical or different and can each be $C_1$-$C_{10}$-alkyl, 5- to 7-membered cycloalkyl or cycloalkenyl, $C_2$-$C_{22}$-alkenyl, $C_6$-$C_{22}$-aryl, $C_1$-$C_4$-alkoxy or $C_6$-$C_{10}$-aryloxy, where the organic radicals $R^{9B}$ may also be substituted by halogens and/or two radicals $R^{9B}$ may also be joined to form a five-, six- or seven-membered ring.

Preferred organic transition metal compounds of the general formula (II) are iminophenoxide complexes in which $A^{1B}$ is $-O-$ and o is 1 and which can be prepared, for example, from substituted or unsubstituted salicylaldehydes and primary amines, in particular substituted or unsubstituted arylamines. The preparation of such compounds is described, for example, in EP-A-1013674.

Further suitable Cp-free complexes are those of the general formula (III):

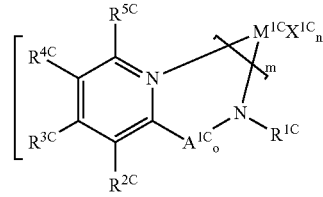

where
$M^{1C}$ is titanium, zirconium or hafnium,
$R^{1C}$ to $R^{5C}$ are each, independently of one another, hydrogen, $C_1$-$C_{22}$-alkyl, 5- to 7-membered cycloalkyl or cycloalkenyl, $C_2$-$C_{22}$-alkenyl, $C_6$-$C_{22}$-aryl, arylalkyl having from 1 to 16 carbon atoms in the alkyl part and from 6 to 21 carbon atoms in the aryl part or $SiR^{8C}_3$, where the organic radicals $R^{1C}$-$R^{5C}$ may also be substituted by halogens and/or two radicals $R^{1C}$-$R^{5C}$, in particular vicinal radicals, may also be joined to form a five-, six- or seven-membered ring, and/or two vicinal radicals $R^{1C}$-$R^{5C}$ may be joined to form a five-, six- or seven-membered heterocycle containing at least one atom from the group consisting of N, P, O and S,
the radicals $X^{1C}$ are each, independently of one another, fluorine, chlorine, bromine, iodine, hydrogen, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $-OR^{6C}$, $-NR^{6C}R^{7C}$, $R^{6C}COO-$ or $R^{6C}R^{7C}N-COO-$, and the radicals $X^{1C}$ may be joined to one another,
$A^{1C}$ is $-CR^{6C}R^{7C}-$ or $-CR^{6C}=$,
m is 1 or 2,
n is 1, 2 or 3 and n, depending on the valence of $M^{1A}$, has the value at which the metallocene complex of the general formula (II) is uncharged,
o is 0 or 1, where
$R^{6C}$ and $R^{7C}$ are each $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part or $SiR^{8C}_3$, where the organic radicals $R^{6C}$ and $R^{7C}$ may also be substituted by halogens and/or two radicals $R^{6C}$ and $R^{7C}$ may also be joined to form a five-, six- or seven-membered ring, and
the radicals $R^{8C}$ can be identical or different and can each be $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part, $C_1$-$C_4$-alkoxy or $C_6$-$C_{10}$-aryloxy, where the organic radicals $R^{8C}$ may also be substituted by halogens and/or two radicals $R^{8C}$ may also be joined to form a five- six- or seven-membered ring.

Preferred organic transition metal complexes of the general formula (III) are complexes in which o is 1, $A^{1C}$ is $-CR^{6C}R^{7C}-$ and $R^{1C}$ is a $C_6$-$C_{22}$-aryl. The preparation of such compounds is descried, for example, in WO 02/046249 and WO 03/040201.

Further suitable Cp-free complexes are complexes having at least one ligand of the general formulae IV to VII,

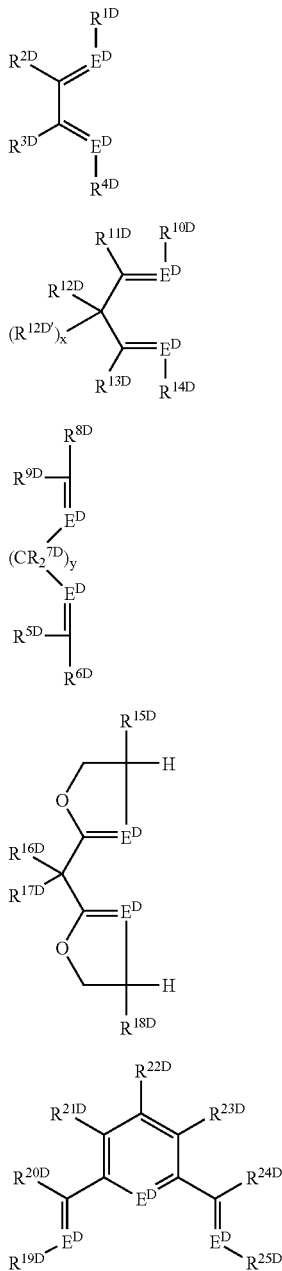

where the transition metal is selected from among the elements Ti, Zr, Hf, Sc, V, Nb, Ta, Cr, Mo, W, Fe, Co, Ni, Pd, Pt and elements of the rare earth metals. Preference is given to compounds having nickel, iron, cobalt or palladium as central metal.

$E^D$ is an element of group 15 of the Periodic Table of the Elements, preferably N or P, particularly preferably N. The two or three atoms $E^D$ in one molecule can be identical or different.

The radicals $R^{1D}$ to $R^{25D}$ within a ligand system IV to VIII can be identical or different and have the following meanings:

$R^{1D}$ and $R^{4D}$ are each, independently of one another, $C_1$-$C_{10}$-aAlkyl, 5- to 7-membered cycloalkyl or cycloalkenyl, $C_2$-$C_{22}$-alkenyl, $C_6$-$C_{22}$-aryl or alkylaryl having from 1 to 10 carbon atoms in the alkyl part and from 6 to 20 carbon atoms in the aryl part, where the organic radicals $R^{1D}$ and $R^{4D}$ may also be substituted by halogens, preferably hydrocarbon radicals in which the carbon atom adjacent to the element $E^D$ is bound to at least two carbon atoms, $R^{2D}$ and $R^{3D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{22}$-aryl or alkylaryl having from 1 to 10 carbon atoms in the alkyl part and from 6 to 20 carbon atoms in the aryl part, where the organic radicals $R^{2D}$ and $R^{3D}$ may also be substituted by halogens and $R^{2D}$ and $R^{3D}$ may also together form a ring system in which one or more heteroatoms may be present, $R^{5D}$ to $R^{9D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{22}$-aryl or alkylaryl having from 1 to 10 carbon atoms in the alkyl part and from 6 to 20 carbon atoms in the aryl part, where the organic radicals $R^{5D}$ to $R^{9D}$ may also be substituted by halogens and $R^{6D}$ and $R^{5D}$ or $R^{8D}$ and $R^{9D}$ or two $R^{7D}$ may together form a ring system, $R^{10D}$ and $R^{14D}$ are each, independently of one another, $C_1$-$C_{10}$-alkyl, 5- to 7-membered cycloalkyl or cycloalkenyl, $C_2$-$C_{22}$-alkenyl, $C_6$-$C_{22}$-aryl or alkylaryl having from 1 to 10 carbon atoms in the alkyl part and from 6 to 20 carbon atoms in the aryl part, where the organic radicals $R^{10D}$ and $R^{14D}$ may also be substituted by halogens, $R^{11D}$, $R^{12D}$, $R^{12D'}$ and $R^{13D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{22}$-aryl or alkylaryl having from 1 to 10 carbon atoms in the alkyl part and from 6 to 20 carbon atoms in the aryl part, where the organic radicals $R^{11D}$, $R^{12D}$, $R^{12D'}$ and $R^{13D}$ may also be substituted by halogens and two or more geminal or vicinal radicals $R^{11D}$, $R^{12D}$, $R^{12D'}$ and $R^{13D}$ may together form a ring system, $R^{15D}$-$R^{18D}$ and $R^{20D}$-$R^{24D}$ are each, independently of one another, hydrogen, $C_1$-$C_{10}$-alkyl, 5- to 7-membered cycloalkyl or cycloalkenyl, $C_2$-$C_{22}$-alkenyl, $C_6$-$C_{22}$-aryl, alkylaryl having from 1 to 10 carbon atoms in the alkyl part and from 6 to 20 carbon atoms in the aryl part or $SiR^{26D}{}_3$, where the organic radicals $R^{15D}$-$R^{13D}$ and $R^{20D}$-$R^{24D}$ may also be substituted by halogens and two vicinal radicals $R^{15D}$-$R^{18D}$ and $R^{20D}$-$R^{24D}$ may also be joined to form a five- or six-membered ring, $R^{19D}$ and $R^{25D}$ are each, independently of one another, $C_6$-$C_{20}$-aryl, alkylaryl having from 1 to 10 carbon atoms in the alkyl part and 6-20 carbon atoms in the aryl part or $NR^{26D}{}_2$, where the organic radicals $R^{19D}$ and $R^{25D}$ may also be substituted by halogens, the radicals $R^{26D}$ are each, independently of one another, hydrogen, $C_1$-$C_{20}$-alkyl, 5- to 7-membered cycloalkyl or cycloalkenyl, $C_2$-$C_{20}$-alkenyl, $C_6$-$C_{22}$-aryl or alkylaryl having from 1 to 10 carbon atoms in the alkyl part and 6-20 carbon atoms in the aryl part and two radicals $R^{26D}$ may also be joined to form a five- or six-membered ring, x is 0 or 1, with the complex of the formula (V) being negatively charged when x is 0, and y is an integer from 1 to 4, preferably 2 or 3.

Particularly suitable Cp-free complexes are those having Fe, Co, Ni, Pd or Pt as central metal and containing ligands of the formula (IV). Particular preference is given to diimine complexes of Ni or Pd, for example:

di(2,6-di-1-propylphenyl)-2,3-dimethyldiazabutadienepalladium dichloride, di(di-1-propylphenyl)-2,3-dimethyldiazabutadienenickel dichloride, di(2,6-di-1-propylphenyl)dimethyldiazabutadienedimethylpalladium, di(2,6-di-1-propylphenyl)-2,3-dimethyldiazabutadienedimethylnickel, di(2,6-dimethylphenyl)-2,3-dimethyldiazabutadienepalladium dichloride, di(2,6-dimethylphenyl)-2,3-dimethyldiazabutadienenickel dichloride, di(2,6-dimethylphenyl)-2,3-dimethyldiazabutadienedimethylpalladium, di(2,6-dimethylphenyl)-2,3-dimethyldiazabutadienedimethylnickel, di(2-methylphenyl)-2,3-dimethyldiazabutadienepalladium dichloride, di(2-methylphenyl)-2,3-dimethyldiazabutadienenickel dichloride, di(2-methylphenyl)-2,3-dimethyldiazabutadienedimethylpalladium, di(2-methylphenyl)-2,3-dimethyldiazabutadienedimethylnickel, diphenyl-2,3-dimethyldiazabutadienepalladium dichloride, diphenyl-2,3-dimethyldiazabutadienenickel dichloride, diphenyl-2,3-dimethyldiazabutadienedimethylpalladium, diphenyl-2,3-dimethyldiazabutadienedimethylnickel, di(2,6-dimethylphenyl)azanaphthenepalladium dichloride, di(2,6-dimethylphenyl)azanaphthenenickel dichloride, di(2,6-dimethylphenyl)azanaphthenedimethylpalladium, di(2,6-dimethylphenyl)azanaphthenedimethylnickel, 1,1'-dipyridylpalladium dichloride, 1,1'-dipyridylnickel dichloride, 1,1'-dipyridyldimethylpalladium, 1,1'-dipyridyldimethylnickel.

Particularly useful compounds (VII) also include those described in J. Am. Chem. Soc. 120, p. 4049 ff. (1998), J. Chem. Soc., Chem. Commun. 1998, 849 and WO 98/27124. $E^D$ is preferably nitrogen and $R^{19D}$ and $R^{25D}$ in (VII) are each preferably phenyl, naphthyl, biphenyl, anthranyl, o-, m-, p-methylphenyl, 2,3-, 2,4-, 2,5-, or 2,6-dimethylphenyl, -dichlorophenyl or -dibromophenyl, 2-chloro-6-methylphehyl, 2,3,4-, 2,3,5-, 2,3,6-, 2,4,5-, 2,4,6- or 3,4,5-trimethylphenyl, in particular 2,3- or 2,6-dimethylpyhenyl, -diisopropylphenyl, -dichlorophenyl or -dibromophenyl and 2,4,6-trimethylphenyl. At the same time, $R^{20D}$ and $R^{24D}$ are preferably hydrogen, methyl, ethyl, n-propyl, isopropyl, n-butyl, tert-butyl, n-pentyl, n-hexyl, n-heptyl, n-octyl, benzyl or phenyl, in particular hydrogen or methyl. $R^{21D}$ and $R^{23D}$ are preferably hydrogen and $R^{22D}$ is preferably hydrogen, methyl, ethyl or phenyl, in particular hydrogen. Preference is given to complexes of the ligands F-VIII with the transition metals Fe, Co or Ni, in particular Fe. Particular preference is given to 2,6-diacetylpyridinebis(2,4-dimethylphenylimine)iron dichloride, 2,6-diacetylpyridinebis(2,4,6-trimethylphenylimine)iron dichloride, 2,6-diacetylpyridinebis(2-chloro-6-methylphenyl)iron dichloride, 2,6-diacetylpyridinebis(2,6-diisopropylphenylimine)iron dichloride, 2,6-diacetylpyridinebis(2,6-dichlorophenylimine)iron dichloride, 2,6-pyridinedicarboxaldehydebis(2,6-diisopropylphenylimine)iron dichloride, 2,6-diacetylpyridinebis(2,4-dimethylphenylimine)cobalt dichloride, 2,6-diacetylpyridinebis(2,4,6-trimethylphenylimine)cobalt dichloride, 2,6-diacetylpyridinebis(2-chloro-6-methylphenyl)cobalt dichloride, 2,6-diacetylpyridinebis(2,6-diisopropylphenylimine)cobalt dichloride, 2,6-diacetylpyridinebis(2,6-dichlorophenylimine)cobalt dichloride and 2,6-pyridinedicarboxaldehydebis(2,6-diisopropylphenylimine)cobalt dichloride.

Further suitable organic transition metal compounds are complexes having bidentate or tridentate chelating ligands having ether, amine or amide functions. In such ligands, an ether function is, for example, linked to an amine or amide function.

Suitable Cp-free complexes also include imidochromium compounds in which, as a structural feature, the chromium bears at least one imido group. These compounds and their preparation are described, for example, in WO 01/09148.

Further suitable Cp-free complexes are complexes having a tridentate macrocyclic ligand, in particular substituted and unsubstituted 1,3,5-triazacyclohexanes and 1,4,7-triazacyclononanes. In the case of this type of complexes, the chromium complexes are likewise preferred. Preferred complexes of this type are [1,3,5-tri(methyl)-1,3,5-triazacyclohexane] chromium trichloride, [1,3,5-tri(ethyl)-1,3,5-triazacyclohexane]chromium trichloride, [1,3,5-tri(octyl)-1,3,5-triazacyclohexane]chromium trichloride, [1,3,5-tri(dodecyl)-1,3,5-triazacyclohexane]chromium trichloride and [1,3,5-tri(benzyl)-1,3,5-triazacyclohexane]chromium trichloride.

In the process of the invention, at least two different organic transition metal compounds, preferably two different organic transition metal compounds, are used. Preferred combinations of organic transition metal compounds which are particularly suitable in the process are ones in which at least one Cp-free complex, in particular a complex of the formula (VIII), is used. Particular preference is also given to combinations comprising at least one complex of the formula I, in particular one complex of the formula I, and a Cp-free complex of the formula VIII, a complex of the formula I and a Cp-free complex of the formula II, a complex of the formula I and a Cp-free complex of the formula III or two different complexes of the formula Ib. The process is particularly useful for combinations comprising a complex of the formula Ib or Id and a Cp-free complex of the formula VIII.

The preferred embodiments of the organic transition metal compounds are also preferred in the respective combinations.

The two organic transition metal compounds can be premixed before being mixed with the hydrolyzed organoaluminum compound, or can be added simultaneously or sequentially.

The ratio of transition metal from the first organic transition metal compound to transition metal from the second, different organic transition metal compound is usually in the range from 1:100 to 100:1, preferably from 1:10 to 10:1 and particularly preferably from 1:8 to 8:1.

The two organic transition metal compounds are mixed with a hydrolyzed organoaluminum compound.

For the purposes of the present invention, a hydrolyzed organoaluminum compound is the reaction product of an organoaluminum compound of the general formula (IX) with a Brønsted acid, $$M^{1E}X^{1E}X^{2E}X^{3E} \qquad (IX)$$

where
$M^{1E}$ is Al,
$X^{1E}$ is hydrogen, $C_1$-$C_{20}$-alkyl, $C_6$-$C_{22}$-aryl or arylalkyl having from 1 to 10 carbon atoms in the alkyl part and from 6 to 20 carbon atoms in the aryl part, where the organic radical $X^{1E}$ may also be substituted by halogens, and
$X^{2E}$ and $X^{3E}$ are each, independently of one another, hydrogen, $C_1$-$C_{20}$-alkyl, $C_6$-$C_{22}$-aryl, arylalkyl having from 1 to 10 carbon atoms in the alkyl part and from 6 to 20 carbon atoms in the aryl part, $C_1$-$C_{10}$-alkoxy or $C_6$-$C_{10}$-aryloxy or fluorine, chlorine, bromine or iodine, where the organic radicals $X^{2E}$ and $X^{3E}$ may also be substituted by halogens.

The organoaluminum compound can also be present in dimeric, trimeric or polymeric form.

Examples of possible Brønsted acids are water, $C_1$-$C_{20}$-alkyl alcohols or $C_6$-$C_{22}$-aryl alcohols, phenol derivatives, thiophenol derivatives or aniline derivatives, with the halogenated and in particular the perfluorinated alcohols and phenols being of particular importance. Examples of particularly useful compounds are pentafluorophenol, 1,1-bis(pentafluorophenyl)methanol and 4-hydroxy-2,2',3,3',4',5,5',6,6'-nonafluorobiphenyl. Examples of combinations of compounds of the formula (IX) with Brønsted acids are, in particular, trimethylaluminum/pentafluorophenol, trimethylaluminum/1-bis(pentafluorophenyl)methanol, trimethylaluminum/4-hydroxy-2,2',3,3',4',5,5',6,6'-nonafluorobiphenyl, triethylaluminum/pentafluorophenol and triisobutylaluminum/pentafluorophenol and triethylaluminum/4,4'-dihydroxy-2,2',3,3',5,5',6,6'-octafluorobiphenyl hydrate.

Well-suited hydrolyzed organoaluminum compounds also include the reaction products of the reaction of a boronic acid with two equivalents of a trialkylaluminum or the reaction products from the reaction of a trialkylaluminum with bis(pentafluorophenyl)borinic acid.

The organic transition metal compounds and the hydrolyzed organoaluminum compound are preferably used in such amounts that the atomic ratio of aluminum from the hydrolyzed organoaluminum compound and the transition metal from the two organic transition metal compounds is in the range from 10:1 to 1000:1, preferably from 20:1 to 500:1 and in particular in the range from 30:1 to 400:1.

Particularly well-suited hydrolyzed organoaluminum compounds are aluminoxanes. As aluminoxanes, it is possible to use, for example, the compounds described in WO 00/31090. Particularly useful aluminoxanes are open-chain or cyclic aluminoxane compounds of the general formula (X) or (XI)

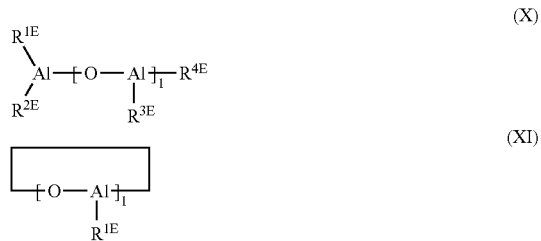

where $R^{1E}$-$R^{4E}$ are each, independently of one another, a $C_1$-$C_{10}$-alkyl group, preferably a methyl, ethyl, butyl or isobutyl group, and I is an integer from 1 to 40, preferably from 4 to 25.

An especially useful aluminoxane compound is methylaluminoxane.

These oligomeric aluminoxane compounds are usually prepared by controlled reaction of a solution of trialkylaluminum, in particular trimethylaluminum, with water. In general, the oligomeric aluminoxane compounds obtained in this way are in the form of mixtures of both linear and cyclic chain molecules of various lengths, so that I is to be regarded as a mean. The aluminoxane compounds can also be used in admixture with other metal alkyls, usually with aluminum alkyls. Suitable aluminoxane preparations are commercially available.

Furthermore, it is possible to use modified aluminoxanes in place of the aluminoxane compounds of the general formula (X) or (XI) as hydrolyzed organoaluminum compounds. In these modified aluminoxanes, some of the hydrocarbon radicals have been replaced by hydrogen atoms or alkoxy, aryloxy, siloxy or amide radicals.

It has been found to be advantageous to use the organic transition metal compounds and the aluminoxane compounds in such amounts that the atomic ratio of aluminum from the aluminoxane compounds including any aluminum alkyl present to the transition metal from the two organic transition metal compounds is in the range from 1:1 to 2000:1, preferably from 10:1 to 500:1 and in particular in the range from 20:1 to 300:1.

A further type of suitable hydrolyzed organoaluminum compounds is the class of hydroxyaluminoxanes. These can be prepared, for example, by adding from 0.5 to 1.2 equivalents of water, preferably from 0.8 to 1.2 equivalents of water, per equivalent of aluminum to an alkylaluminum compound, in particular triisobutylaluminum, at low temperatures, usually below 0° C. Such compounds and their use in olefin polymerization are described, for example, in WO 00/24787. The atomic ratio of aluminum from the hydroxyaluminoxane compound to the transition metal from the two organic transition metal compounds is usually in the range from 1:1 to 100:1, preferably from 10:1 to 50:1 and in particular in the range from 20:1 to 40:1.

The hydrolyzed organoaluminum compound and the two organic transition metal compounds are mixed in any order. Mixing is carried out in a solvent. Mixing is generally carried out over a period of from 1 minute to 10 hours, preferably from 5 minutes to up to 5 hours and particularly preferably from 10 minutes to up to 2 hours. Mixing can be carried out at temperatures of from −20 to 120° C., preferably at temperatures of from 0 to 70° C. and particularly preferably at temperatures of from 18 to 30° C.

Suitable solvents are aprotic solvents, in particular hydrocarbons such as aromatic hydrocarbons having 6-20 carbon atoms, e.g. toluene, ethylbenzene or xylene, or aliphatic hydrocarbons having 6-20 carbon atoms, e.g. hexane such as n-hexane or isohexane, heptane, octane or decalin or mixtures of various hydrocarbons. Particular preference is given to toluene, hexane and heptane and also mixtures thereof. The hydrolyzed organoaluminum compound is preferably present in solution, preferably in a hydrocarbon. It is usual to add the two organic transition metal compounds to this. The hydrolyzed organoaluminum compound is preferably present in a concentration of from 0.5 to 5 M, in particular from 1 to 3 M.

It has been found to be advantageous to activate the two organic transition metal compounds together with the hydrolyzed organoaluminum compound for a further period of from 30 minutes to 8 hours, particularly preferably from 45 minutes to 3 hours, after mixing is complete and before addition to the support component in step b). In the following, activation means that the components in the mixture are given time to react with one another. The mixture is preferably stirred during this time.

Activation can be carried out at temperatures of from 0 to 150° C. Activation is preferably carried out at temperatures of from 18 to 100° C. and in particular at temperatures of from 30 to 60° C. The activity of the catalyst system of the invention can be additionally increased in this way. Mixing and activation can be carried out in the presence or absence of light, depending on the light sensitivity of the organic transition metal compound.

The total volume of the mixture formed initially in step A) can also be higher than 1.5 times the total pore volume of the support component. In this case, the total volume of the mixture has to be reduced to from 0.6 to 1.5 times the total pore volume of the support component, for example by distilling off the solvent, before being brought into contact with the support component. The total volume of the mixture formed in step A) is preferably in the range from 0.6 to 1.5 times the total pore volume of the support component, more preferably in, the range from 0.8 to 1.1 times the total pore volume and particularly preferably in the range from 0.85 to 0.99 times the total pore volume of the support component. This volume is preferably obtained directly in step A) without reducing the volume of the mixture. The use of this mixing volume gives a catalyst having very good powder flow, which makes it particularly suitable for use in gas-phase polymerization. In addition, the catalyst displays a high activity. The mixture used after step A) is preferably a solution or suspension.

As support component, preference is given to using finely divided supports which can be any organic or inorganic solid. In particular, the support component can be a porous support such as talc, a sheet silicate such as montmorillonite, mica, an inorganic oxide or a finely divided polymer powder (e.g. polyolefin or a polymer having polar functional groups). The support is dry, i.e. it is not suspended in a solvent and the residual moisture content is less than 2% by weight, preferably less than 1% by weight and particularly preferably less than 0.5% by weight, based on moist support components.

The support materials used preferably have a specific surface area in the range from 10 to 1000 m$^2$/g, a pore volume in the range from 0.1 to 5 ml/g and a mean particle size of from 1 to 500 µm. Preference is given to supports having a specific surface area in the range from 50 to 700 m$^2$/g, a pore volume in the range from 0.4 to 3.5 ml/g and a mean particle size in the range from 5 to 350 µm. Particular preference is given to supports having a specific surface area in the range from 200 to 550 m$^2$/g, a pore volume in the range from 0.5 to 3.0 ml/g and a mean particle size of from 10 to 150 µm.

The inorganic support can be subjected to a thermal treatment, e.g. to remove adsorbed water. Such a drying treatment is generally carried out at temperatures in the range from 50 to 100° C., preferably from 100 to 600° C., with drying at from 100 to 200° C. preferably being carried out under reduced pressure and/or a blanket of inert gas (e.g. nitrogen), or the inorganic support can be calcined at temperatures of from 200 to 1000° C., if appropriate to produce the desired structure of the solid and/or to set the desired OH concentration on the surface. The support can also be treated chemically using customary desiccants such as metal alkyls, preferably aluminum alkyls, chlorosilanes or SiCl$_4$, or else methylaluminoxane. Appropriate treatment methods are described, for example, in WO 00/31090. The support component used preferably contains less than 2.5% by weight of water, in particular from 0 to 2% by weight of water and particularly preferably from 0.5 to 1.5% by weight of water, in each case based on the support component.

The inorganic support material can also be chemically modified. For example, the treatment of silica gel with NH$_4$SiF$_6$ or other fluorinating agents leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by appropriate purification and drying operations before use. It is also possible to use functionalized polymer supports, e.g. ones based on polystyrene, polyethylene, polypropylene or polybutylene, via whose functional groups, for example ammonium or hydroxy groups, at least one of the catalyst components can be immobilized. Polymer blends can also be used.

Suitable support components may be found among the inorganic oxides of the elements of groups 2, 3, 4, 5, 13, 14, 15 and 16 of the Periodic Table of the Elements. Examples of oxides preferred as supports include silicon dioxide, aluminum oxide and mixed oxides of the elements calcium, aluminum, silicon, magnesium or titanium and also corresponding oxide mixtures. Other inorganic oxides which can be used alone or in combination with the abovementioned preferred oxidic supports are, for example, MgO, CaO, AlPO$_4$, ZrO$_2$, TiO$_2$, B$_2$O$_3$ or mixtures thereof.

Further preferred support components are mixed metal-hydroxides having a sheet structure, in particular hydrotalcites and calcined hydrotalcites. Preferred calcined hydrotalcites are mixed oxides of aluminum and magnesium. Aluminum-magnesium mixed oxides of this type are obtainable from Condea Chemie GmbH (now Sasol Chemie), Hamburg, under the trade name Puralox Mg.

Other preferred inorganic support materials are inorganic halides such as MgCl$_2$ or carbonates such as Na$_2$CO$_3$, K$_2$CO$_3$, CaCO$_3$, MgCO$_3$, sulfates such as Na$_2$SO$_4$, Al$_2$(SO$_4$)$_3$, BaSO$_4$, nitrates such as KNO$_3$, Mg(NO$_3$)$_2$ or Al(NO$_3$)$_3$.

Particular preference is given to using silica gels as solid support component, since particles whose size and structure make them particularly suitable as supports for olefin polymerization can be produced from this material. In particular spray-dried silica gels comprising spherical agglomerates of smaller granular particles, i.e. primary particles, have been found to be particularly useful. The silica gels can be dried and/or calcined before use.

The silica gels used are generally used as finely divided powders having a mean particle diameter D50 of from 5 to 200 µm, preferably from 10 to 150 µm, particularly preferably from 15 to 100 µm and in particular from 20 to 70 µm, and usually have pore volumes of from 0.1 to 10 cm$^3$/g, preferably from 0.2 to 5 cm$^3$/g, and specific surface areas of from 30 to 1000 m$^2$/g, preferably from 50 to 800 m$^2$/g and in particular from 100 to 600 m$^2$/g.

The mixed and optionally activated components from step A) are brought into contact with the support component in step B). The organic transition metal compounds are preferably applied in such an amount that the concentration of the sum of transition metals from the organic transition metal compounds is from 1 to 200 µmol, preferably from 10 to 150 µmol and particularly preferably from 10 to 80 µmol, per g of support component.

The mixture from step A) can, for example, be dripped or sprayed onto the support component while stirring. The stirring rate is preferably set so that the support material is not damaged.

The support component can also be brought into contact with the hydrolyzed organoaluminum compound or a metal compound of the formula (XII) before being brought into contact with the mixture from step A).

The metal compound of the formula (XII) is

 (XII)

where
M$^{1F}$ is Li, Na, K, Be, Mg, Ca, Sr, Ba, boron, aluminum, gallium, indium, thallium, zinc, in particular Li, Na, K, Mg, boron, aluminum or Zn,
R$^{1F}$ is hydrogen, C$_1$-C$_{20}$-alkyl, C$_6$-C$_{22}$-aryl, arylalkyl having from 1 to 10 carbon atoms in the alkyl part and from 6 to 20 carbon atoms in the aryl part,
R$^{2F}$ and R$^{3F}$ are each hydrogen, halogen, C$_1$-C$_{20}$-alkyl, C$_6$-C$_{22}$-aryl, arylalkyl having from 1 to 20 carbon atoms in the alkyl part and from 6 to 20 carbon atoms in the aryl part, or alkoxy with C$_1$-C$_{10}$-alkyl or C$_6$-C$_{22}$-aryl,
r is an integer form 1 to 3
and s and t are integers from 0 to 2, with the sum r+s+t corresponding to the valence of $M^{1F}$.

It is also possible to use mixtures of various metal compounds of the formula (XII).

Among the metal compounds of the general formula (XII), preference is given to those in which
$M^{1F}$ is lithium, magnesium or aluminum and
$R^{1F}$ is $C_1$-$C_{20}$-alkyl.

Particularly preferred metal compounds of the formula (XII) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethylaluminum, dimethylaluminum chloride, diethylaluminum fluoride, methylaluminum dichloride, methylaluminum sesquichloride, diethylaluminum chloride and trimethylaluminum and mixtures thereof.

When a hydrolyzed organoaluminum compound or a metal compound (XII) is used to react with the support component, it is preferably present in the catalyst system in such an amount that the molar ratio of $M^{1E}$ from formula (IX) or $M^{1F}$ from the formula (XII) to transition metal from the two organic transition metal compounds is from 3000:1 to 0.1:1, preferably from 800:1 to 0.2:1 and particularly preferably from 100:1 to 1:1.

The support component is preferably modified by means of a hydrolyzed organoaluminum compound, in particular an aluminoxane, before being brought into contact with the mixture from step A). For this purpose, the support component is brought into contact with a hydrolyzed organoaluminum compound, in particular an aluminoxane, before being brought into contact with the mixture from step A). This is usually carried out in solution. The solvent is subsequently removed completely again in order to obtain the dry support component. The residual moisture content of the support content which has been modified in this way is the same as that described above for the unmodified support component. This variant, too, increases the activity of the catalyst system further.

Step B) is preferably followed by a step C), viz. isolation of the impregnated porous support whose pores are filled with the solution. After process step B), the catalyst can optionally be washed with suitable inert solvents such as aliphatic or aromatic hydrocarbons.

After process step B), the solvent is optionally removed completely or partly in step C). This gives a solid in the form of a free-flowing powder. The solvent is preferably removed partly, so that the residual moisture content is from 0 to 80% by weight based on the moist catalyst, preferably from 1 to 60% by weight and particularly preferably 10 to 50% based on the moist catalyst. The catalyst obtained in this way displays very good powder flow. The residual moisture content can be estimated in a simple fashion by calculating the weight of the catalyst on the assumption that all starting materials apart form the solvents have been taken up by the support and comparing this theoretical weight with the actual weight (the yield) of the catalyst.

This gives a catalyst system for the polymerization of olefins whose angle of repose determined in accordance with ISO 4324 is not more than 48° and comprises at least two different organic transition metal compounds and at least one hydrolyzed organoaluminum compound. The organic transition metal compounds and hydrolyzed organoaluminum compounds which are preferably used in the process are likewise preferred constituents of the catalyst system. For the purposes of the invention, the fluidity index is the height of the poured cone. It is, firstly, important that the angle of repose of the catalyst system of the invention, determined in accordance with ISO 4324, is not more than 48°. The angle of repose is a suitable measure of the powder flow of the supported metal alkyl and thus also for its suitability in terms of meterability. The catalyst system of the invention flows readily from the metering apparatuses into the polymerization reactor and is therefore particularly useful for gas-phase polymerization. The preferred embodiments in the process for producing the catalyst system are also preferred in this catalyst system.

It is also possible for the catalyst system firstly to be prepolymerized with x-olefins, preferably linear $C_2$-$C_{10}$-1-alkenes and in particular ethylene or propylene, and the resulting prepolymerized catalyst solid then to be used in the actual polymerization. The molar ratio of catalyst solid used in the prepolymerization to monomer polymerized onto it is usually in the range from 1:0.1 to 1:1000, preferably from 1:1 to 1:200.

Furthermore, a small amount of an olefin, preferably an α-oefin, for example vinylcyclohexane, styrene or phenyldimethylvinylsilane, as modifying component, an antistatic or a suitable inert compound such as a wax or oil can be added as additive during or after the production of the catalyst system. The molar ratio of additives to the two organic transition metal compounds is usually from 1:1000 to 1000:1, preferably from 1:5 to 20:1.

The catalyst systems of the invention are suitable for the polymerization of olefins and especially for the polymerization of α-olefins, i.e. hydrocarbons having terminal double bonds. Suitable monomers also include functionalized olefinically unsaturated compounds such as acrolein, ester or amide derivatives of acrylic or methacrylic acid, for example acrylates, methacrylates or acrylonitrile, or vinyl esters, for example vinyl acetate. Preference is given to nonpolar olefinic compounds, including aryl-substituted α-olefins. Particularly preferred x-olefins are linear or branched $C_2$-$C_{12}$-1-alkenes, in particular linear $C_2$-$C_{10}$-1-alkenes such as ethene, propene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,5-hexadiene or 1,7-octadiene or vinylaromatic compounds such as styrene or substituted styrene. It is also possible to polymerize mixtures of various α-olefins. Preference is given to polymerizing at least one olefin selected from the group consisting of ethene, propene, 1-butene, 1-pentene, 1-hexene, 1-heptene, 1-octene and 1-decene.

Suitable olefins also include ones in which the double bond is part of a cyclic structure which can have one or more ring systems. Examples are cyclopentene, cyclohexene, norbornene, tetracyclododecene and methylnorbornene and dienes such as 5-ethylidene-2-norbornene, norbornadiene or ethylnorbornadiene.

Mixtures of two or more olefins can also be polymerized. In particular, the catalyst systems of the invention can be used for the polymerization or copolymerization of ethene or propene. As comonomers in the polymerization of ethene, preference is given to using $C_3$-$C_8$-α-olefins or norbornene, in particular 1-butene, 1-pentene, 1-hexene and/or 1-octene. Preference is given to using monomer mixtures containing at least 50 mol % of ethene. Preferred comonomers in the polymerization of propylene are ethene and/or butene.

The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes or gas-phase fluidized-bed processes are all possible.

The polymerizations are usually carried out at temperatures in the range from −60 to 350° C. and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are usually carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, a temperature which is at least a few degrees below the softening temperature of the polymer is generally set. In particular, temperatures of from 50 to 180° C., preferably from 70 to 120° C., are set in these polymerization processes. In the case of suspension polymerizations, the polymerization is usually carried out in a suspension medium, preferably an inert hydrocarbon such as isobutane or mixtures of hydrocarbons or else in the monomers themselves. The polymerization temperatures are generally in the range from −20 to 115° C., and the pressure is generally in the range from 1 to 100 bar. The solids content of the suspension is generally in the range from 10 to 80%. The polymerization can be carried out batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gasphase polymerization is generally carried out in the range from 30 to 125° C.

Among the abovementioned polymerization processes, particular preference is given to gas-phase polymerization, in particular in gas-phase fluidized-bed reactors. The gas-phase polymerization can also be carried out in the condensed or supercondensed mode, in which part of the circulating gas is cooled to below the dew point and is recirculated as a two-phase mixture to the reactor. It is also possible to use a multizone reactor in which two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series to form a polymerization cascade, for example as in the Hostalen process. A parallel reactor arrangement using two or more identical or different processes is also possible. Furthermore, molar mass regulators, for example hydrogen, or customary additives such as anti-statics can also be used in the polymerizations.

The transition metal complexes used according to the invention and the catalyst systems in which they are present can also be produced by means of combinations of methods or their polymerization activity can be tested with the aid of these combined methods.

The process of the invention allows polymers of olefins to be prepared. The term "polymerization" as used here in the description of the invention encompasses both polymerization and oligomerization, i.e. oligomers and polymers having molar masses M, in the range from about 56 to 10 000 000 g/mol can be produced by this process.

The catalyst systems of the invention give a very high productivity in the polymerization of olefins, offer advantages in the metering of the catalyst system into the polymerization reactor and lead to significantly fewer problems in respect of catalyst residues in the polymer. The polymers prepared using the catalyst system of the present invention are particularly useful for applications which require a high product purity. In addition, the catalyst systems of the invention display a very good activity even at a relatively low molar ratio of aluminoxane to organic transition metal compound.

EXAMPLES

The following tests were carried out to characterize the samples:

Determination of the Specific Surface Area:
By nitrogen adsorption in accordance with DIN 66131

Determination of the Pore Volume:
By mercury porosimetry in accordance with DIN 66133

Determination of D10, D50 and D90:
The particle size distribution of the particles were measured in a dispersion in isopropanol by laser light scattering using a Mastersizer X from Malvern, Great Britain. The sizes D10, D50 and D90 are the volume-based percentiles of the diameter. The D50 value is at the same time the median of the particle size distribution.

Determination of the Angle of Repose:
The powder flow was determined using the method of ISO 4324. ISO 4324 is a standard which is actually intended for testing the angle of repose of surfactants in powder or granule form, but can also be applied to other powders and granular materials having comparable properties. The determination of the angle of repose was carried out under an inert atmosphere.

A lower angle of repose indicates better powder flow of the pulverulent solid. The angles of repose were, in the interests of simplicity, divided into the following powder flow classes:

| Angle of repose [°] | Powder flow class | Assessment |
|---|---|---|
| up to 44 | 1 | very good |
| 44-46 | 2 | good |
| 46-48 | 3 | slightly sticky |
| 48-50 | 4 | poor |
| above 50 | 5 | very poor |

Determination of the OH Number:
About 20 g of the solid to be examined are suspended in 250 ml of heptane and the suspension is cooled to 0° C. while stirring. At a constant temperature, 40 ml of a 2 M solution of triethylaluminum in heptane are added continuously over a period of 30 minutes. The ethane formed is collected and determined volumetrically. The OH number is the molar amount of ethane formed/mass of support used.

Determination of the Residual Moisture Content:
The residual moisture content is the content of volatiles obtained from a measurement under an inert gas atmosphere using a Mettler LJ 16 Moisture Analyzer from Mettler-Toledo, Greifensee, Switzerland.

The silica gel XPO-2107 used, a spray-dried silica gel from Grace, was baked at 600° C. for 6 hours. It had a pore volume of 1.5 ml/g, and a water content of less than 1% by weight.

Bis(n-butylcyclopentadienyl)hafnium dichloride is commercially available from Crompton.

2,6-Diacetylpyridinebis(2,4-dichloro-6-methylphenylanil)iron dichloride was prepared by the method of Qian et al., Organometallics 2003, 22, 4312-4321. Here, 65.6 g of 2,6-diacetylpyridine (0.4 mol), 170 g of 2,4-dichloro-6-methylaniline (0.483 mol), 32 g of silica gel type 135 and 160 g of molecular sieves (4 Å) were stirred in 1500 ml of toluene at 80° C. for 5 hours and a further 32 g of silica gel type 135 and 160 g of molecular sieves (4 Å) were subsequently added. The mixture was stirred at 80° C. for a further 8 hours, the insoluble solid was filtered off and washed twice with toluene. The solid was distilled off from the resulting filtrate, the residue was admixed with 200 ml of methanol and subsequently stirred at 55° C. for 1 hour. The suspension formed in this way was filtered and the solid obtained washed with methanol and freed of the solvent. This gave 95 g of 2,6-diacetylpyridinebis(2,4-dichloro-6-methylphenylanil) in a yield of 47%. The reaction with iron(II) chloride was carried out as described by Qian et al., Organometallics 2003, 22, 4312-4321.

Example 1

A mixture of 632 mg (1.042 mmol) of 2,6-diacetylpyridinebis(2,4-dichloro-6-methylphenylanil)iron dichloride, 4.38 g (8.903 mmol) of bis(n-butylcyclopentadienyl)hafnium dichloride and 188 ml of MAO (4.75 M in toluene, 895 mmol) was stirred at room temperature for 30 minutes and subsequently added to 147.9 g of the pretreated support material while stirring and the mixture was stirred at room temperature for a further 2 hours ((Fe+Hf):Al=1:90). The ratio of the total volume of the added solution to the pore volume of the support was 0.84. The solid was dried under reduced pressure until it was free-flowing. This gave 310.4 g of catalyst which still contained 34% by weight of solvent (based on the total weight and calculated assuming complete application of all components to the support).

Comparative Example C1

A mixture of 3.2 mg (56.44 μmol) of 2,6-diacetylpyridinebis(2,4-dichloro-6-methylphenylanil)iron dichloride and 1.07 ml of MAO (4.75 M in toluene, 5.07 mmol) in a further 10 ml of toluene was stirred at room temperature for 30 minutes and subsequently added to 8.6 g of the pretreated support material while stirring and the mixture was stirred at room temperature for a further 2 hours. The ratio of the total volume of the added solution to the pore volume of the support was 0.85. The solid was dried under reduced pressure until it was free-flowing and the calculated residual moisture content of solvent was less than 5%. A mixture of 241.6 mg (491.13 μmol) of bis(n-butylcyclopentadienyl)hafnium dichloride and 9.3 ml of MAO (4.75 M in toluene, 44.21 mmol) in a further 1.7 ml of toluene, which had been stirred at room temperature for 30 minutes beforehand, was added to the solid obtained in this way and the mixture was subsequently stirred at room temperature for a further two hours. The ratio of the total volume of the added solution to the pore volume of the support was 0.85. The solid was dried under reduced pressure until it was free-flowing and the calculated residual moisture content of solvent was less than 5%. ((Fe+Hf):Al=1:90). This gave 12 g of catalyst which still contained 2.3% by weight of solvent (based on the total weight and calculated assuming complete application of all components to the support).

Polymerization 2 ml of a triisobutylaluminum solution in heptane (corresponding to 75 mg of triisoprenylaluminum) were added to a 1 l autoclave which had been charged with an initial charge of 100 g of polyethylene and had been made inert by means of argon, and the amount of catalyst solid indicated in table 1 was finally introduced. Polymerization was carried out at an ethylene pressure of 10 bar (total pressure=19 bar) and 90° C. for 60 min. The polymerization was stopped by venting the autoclave and the product was discharged through the bottom valve. The data pertaining to the polymerizations are summarized in table 1. In the case of the polymerization using the catalyst from C1, polymer deposits were found in the metering apparatus after the polymerization was stopped.

TABLE 1

| | Polymerization results | | |
|---|---|---|---|
| Catalyst from Ex. | Amount of cat. [mg] | Prod. [g/g of cat · h] | Angle of repose [°] |
| 1 | 205 | 650 | 43.3 |
| C1 | 216 | 352 | 48.8 |

Abbreviation in the table:
Prod. Productivity in g of polymer obtained per g of catalyst used
Cat. Catalyst

The invention claimed is:
1. A process for producing a catalyst system, comprising:
   (a) mixing at least two different organic transition metal compounds, at least one hydrolyzed organoaluminum compound, and a solvent to form a liquid mixture; and
   (b) impregnating a dry porous support component with the liquid mixture;
   wherein the volume of the liquid mixture is from 0.6 to 1.5 times the pore volume of the support component.
2. The process of claim 1 wherein the support is silica or calcined hydrotalcite.
3. The process of claim 1 wherein the hydrolyzed organoaluminum compound is an aluminoxane.
4. The process of claim 1 wherein the support component is modified by the hydrolyzed aluminum compound before being brought into contact with the liquid mixture.
5. A catalyst system, useful for polymerizing olefins, which comprises at least two different organic transition metal compounds, at least one hydrolyzed organoaluminum compound, and a dry porous support component, wherein the catalyst system has an angle of repose, determined in accordance with ISO 4324, of not more than 48 degrees.
6. A process which comprises polymerizing at least one olefin in the presence of the catalyst system of claim 5.
7. The process of claim 6 wherein the olefin is ethylene or a mixture comprising at least 50 mole % of ethylene and at least one $C_3$-$C_{12}$ 1-alkene.

* * * * *